June 28, 1927.
F. K. CARRICK
WEED ERADICATOR
Filed March 6, 1925
1,634,172
3 Sheets-Sheet 1
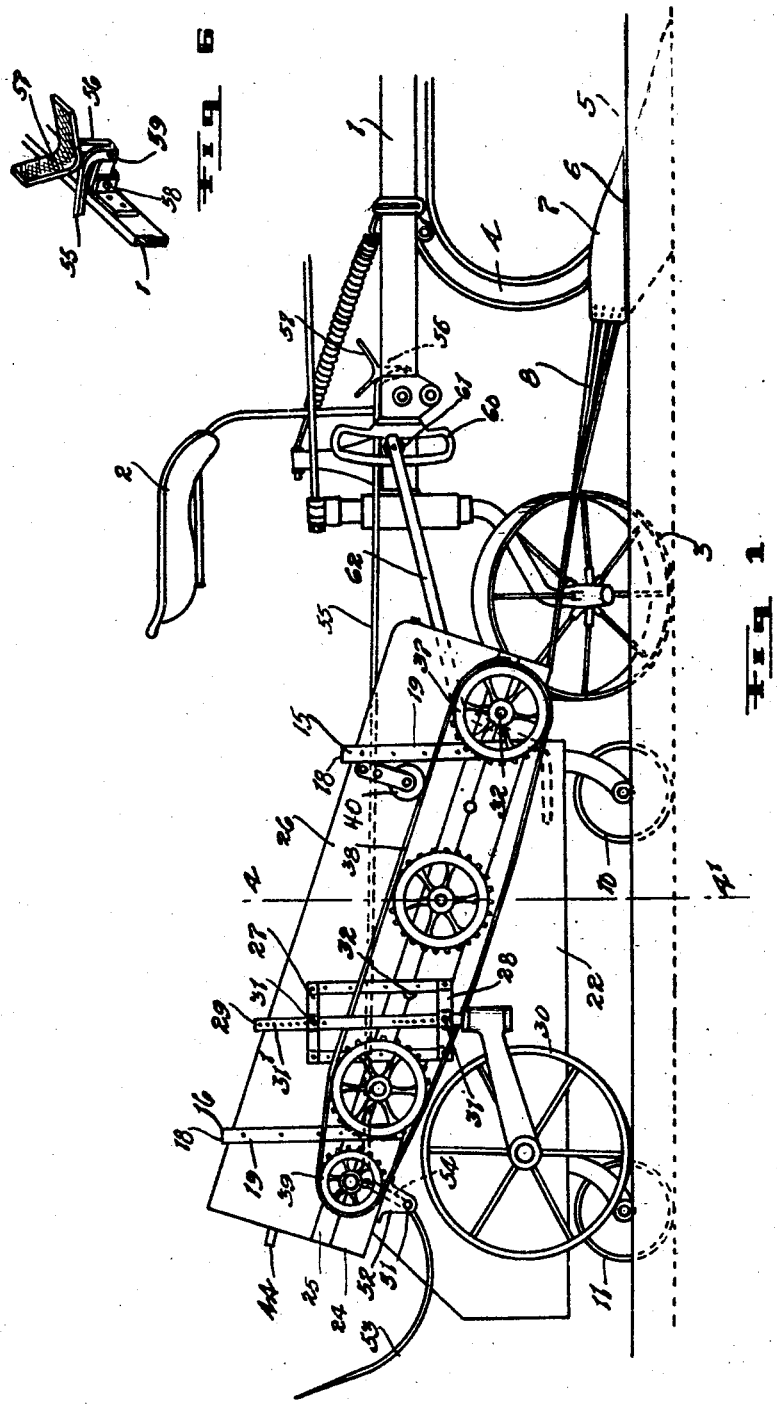
Inventor
F. K. Carrick
By

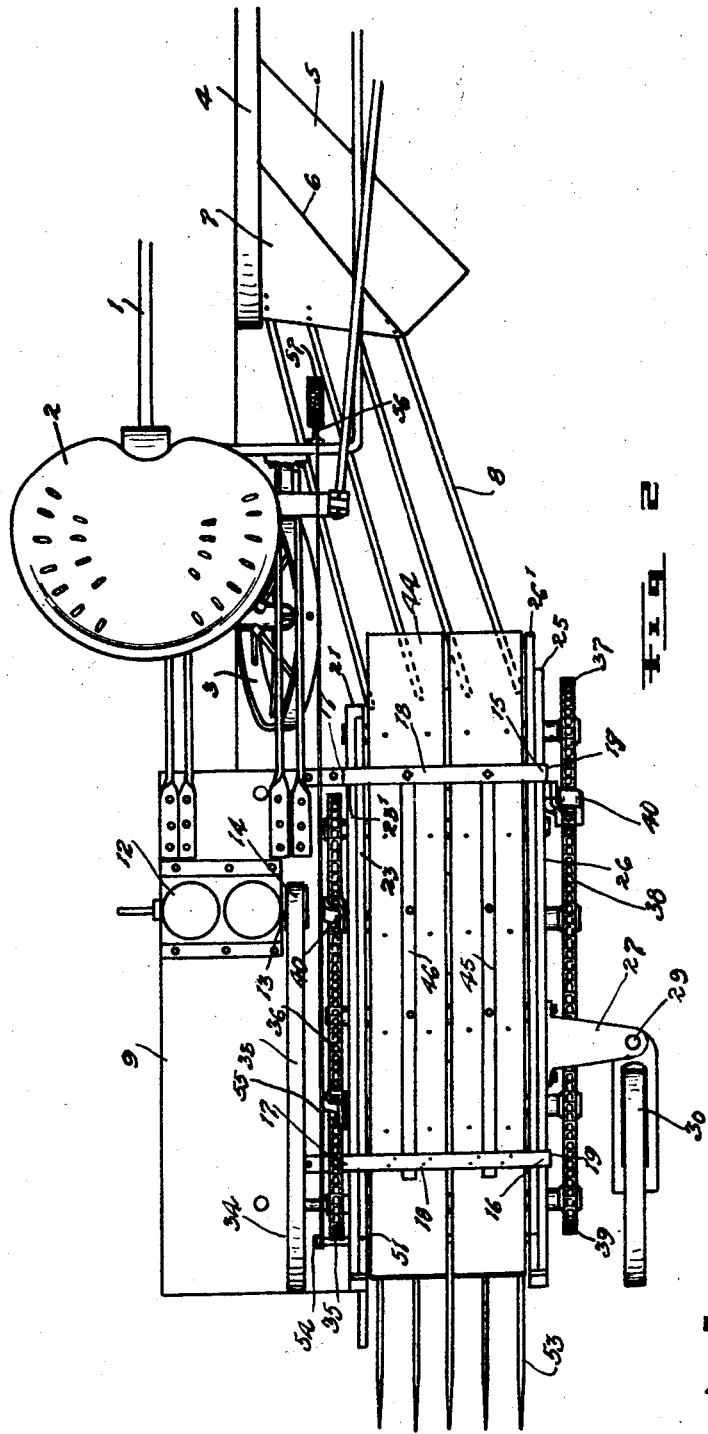

June 28, 1927.
F. K. CARRICK
WEED ERADICATOR
Filed March 6, 1925
1,634,172
3 Sheets-Sheet 3
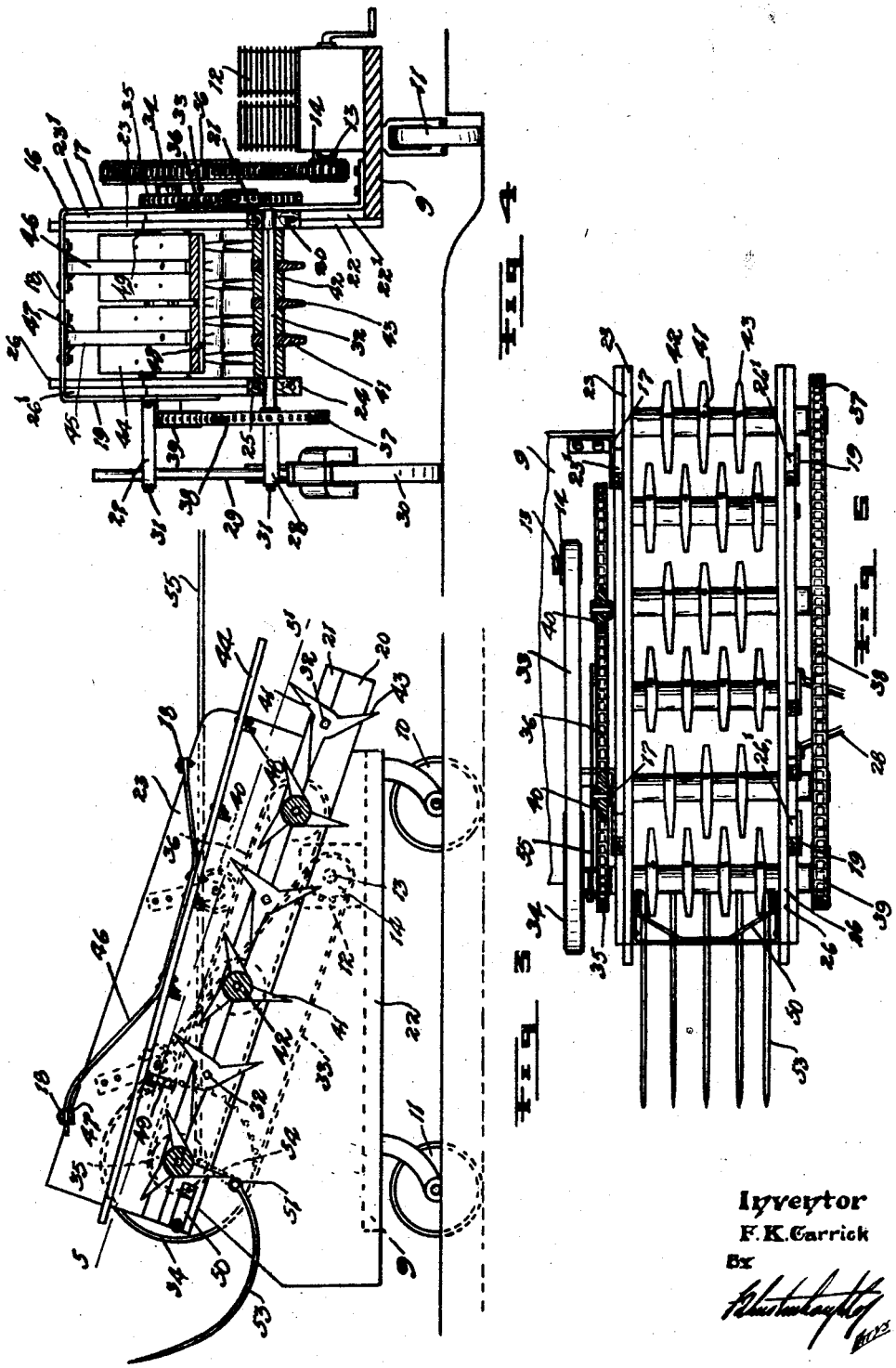
Inventor
F. K. Carrick
By Patented June 28, 1927.

1,634,172

UNITED STATES PATENT OFFICE.

FRANKLIN KING CARRICK, OF RAPID CITY, MANITOBA, CANADA.

WEED ERADICATOR.

Application filed March 6, 1925. Serial No. 13,547.

The invention relates to improvements in weed eradicators and an object of the invention is to provide an agricultural machine which can be moved over the field behind a plough and will receive the ploughed earth and will effectively separate the weeds from the dirt and will leave the separated weeds lying on top of the soil where they are exposed to the killing effects of the weather and sun.

A further and more particular object is to provide a machine which can be readily hitched to a sulky or gang plough and to which the ploughed earth is fed, ground or surface side up in order to maintain the weeds at the top and to construct the machine such that the clods of earth will be broken to loosen the dirt and separate out the weeds, the weeds being carried rearwardly and the earth dropped down so that the weeds can be dropped on the surface of the soil.

A further object of the invention is to construct a machine so that the separated weeds can be collected and dropped in windrows thereby facilitating the subsequent gathering of them.

A further object is to construct a machine so that it can be adjusted in respect to the ground and in relation to the ploughed furrow.

A further object is to construct the teeth of the beaters such that the beaters can be changed to accommodate different types of weeds encountered.

With the above more important and other minor objects in view which will become more apparent as the description proceeds, the invention consists essentially in the arrangement and construction of parts hereinafter described, reference being had to the accompanying drawings, in which:

Fig. 1 is a side view of the complete machine, as it appears hitched to a sulky plough.

Fig. 2 is a plan view of the machine and part of the plough.

Fig. 3 is a central vertical sectional view longitudinally through the machine.

Fig. 4 is a vertical sectional view at 4—4' Fig. 1.

Fig. 5 is a horizontal sectional view at 5—5' Figure 3.

Fig. 6 is a perspective view of the foot pedal utilized.

In the drawings, like characters of reference indicate corresponding parts in the several figures.

The machine as above intimated is drawn by a plough and is herein shown as connected to a single furrow sulky plough. The structural details of a sulky plough are well known and accordingly, I have only shown those parts with which my device is immediately associated.

The main frame 1 of the plough supports the customary rearwardly disposed driver seat 2 and the rear end of the frame is adjustably supported by the rear furrow wheel 3. The plough beam 4 carries the customary plough but in my particular case, I remove the mould board of the plough and substitute a plate. The customary share of the plough is shown at 5, the upper edge of the share being indicated by the line 6. The mould board of the plough as is well known turns the earth cut by the plough, rolling it over to put the soil or sod surface under and I wish here, however, to point out that I do not desire the ploughed earth to be turned over as I require to deliver the ploughed earth top or soil side up to my machine. With this object in view, I remove the plough mould board as before stated and substitute a plate 7 to the rear edge of which I secure a plurality of spaced fingers 8 which gather the earth ploughed by the plough and deliver it top side up to the front end of my machine. The machine comprises parts hereinafter described.

A suitably constructed engine platform 9 is provided, this being horizontal and located at the land side of the machine and being suitably supported forwardly and rearwardly by caster wheels 10 and 11, which operate in the furrow plowed by the plow. The engine 12, herein shown as an internal combustion engine, is mounted on the platform and presents the customary driving shaft 13 fitted with a pulley 14. To the platform, I permanently secure front and rear brackets 15 and 16 which present upstanding legs 17, cross arms 18 and downwardly extending hangers 19, the cross arms being elevated and the hangers being spaced opposite to and at some distance from the legs.

To the legs 17, I secure an upwardly and rearwardly inclining pair of beams 20 and 21 which form bearings for cross shafts later described.

Above and below the beams, I locate side boards 22 and 23 which are flush with the inner faces of the beams and which form with the beams a vertical side wall at the platform side of the machine. These side boards are fastened through filler strips 22' and 23' to the legs 17. A further pair of beams 24 and 25 are located directly opposite the beams 20 and 21 and are secured permanently to the lower ends of the hangers 19. A side board 26 is located above the beam 24 and a filler strip 26' is placed between the side board and the hangers and the side board 26 is secured to the hangers through the filler strips. This side board 26 forms a vertical wall spaced from and directly opposing the other wall hereinbefore mentioned.

Opposing horizontally disposed outwardly extending standards 27 and 28 are secured to the side wall of the machine remote from the platform and these standards provide bearings for a vertically disposed spindle 29, the lower end of which is provided with swivelled land wheel 30. The shaft 29 is provided with adjusting openings 31' and the bearings carry adjusting screws 31 adapted to enter the openings, this arrangement permitting of the adjustment of that side of the machine. Obviously the wheel 30 supports one side of the machine and those 10 and 11 support the other side.

The pairs of side beams support a plurality of similar equi-spaced cross shafts 32, there being six cross shafts shown in the present instance. Starting from the front end of the machine, the first, third and fifth cross shafts form a set and this set of shafts is driven at a slower speed than the other set which comprises the remaining cross shafts. The engine pulley 14 is connected by a belt 33 to a driving pulley 34 secured to the platform end of the rear shaft 32, it being here observed that the pulley 34 is much larger than that 14.

To the rearmost cross shaft 32, I secure also a chain wheel 35 and it is connected by an endless chain 36 to similar chain wheels secured to the adjacent ends of the second and fourth cross shafts, the arrangement being such that the cross shafts of this set are all driven in the same direction and at the same speed by the chain 36. The ends of the first, third and fifth cross shafts remote from the platform are all fitted with similar chain wheels 37, somewhat larger than those 35 and the chain wheels 37 are all simultaneously driven at the same speed and in the same direction by a continuous chain 38 which is driven by a chain wheel 39 secured to the rearmost cross shaft at the end remote from the platform. Suitable chain tighteners 40 are provided. When the engine is started the cross shafts are all rotated in the same direction as indicated by the applied arrow in Figure 3 and the sets of cross shafts are driven at different speeds, the first, third and fifth shafts rotating slower than the remaining ones.

On all the cross shafts, I locate similar beaters 41 which are separated by rollers 42, the beaters rotating with the cross shafts. Each beater presents a plurality of teeth 43 and the beaters on adjacent cross shafts are arranged in staggered relation and lap so that the teeth pass one another when revolving. The teeth have the advancing sides thereof more nearly radial to the cross shafts than the rear sides for a purpose later disclosed. Above the beaters, I locate a floating pressure plate 44 which is contained between the side walls and is held normally in an angular position in respect to the beaters by similar spring bars 45 and 46, the spring bars having their forward ends permanently fastened to the forward bracket 15 and their rear ends slidably suspended from the rear bracket 16 by straps 47. The under side of the plate carries arresters 48 which in the present instance are shown as angle bars, bolted to the plate and crossing the same. An angle bracket 49 is secured to each side wall of the machine and limits the lowermost position of the rear end of the plate.

Brace bars 50 extend between the rear ends of the beams 20 and 24. A cross shaft 51 underlies the rearmost cross shaft 32 and is pivotally supported by the side board 22 and a bearing 52 secured to the beam 24. This cross shaft 51 carries gathering forks 53 suitably spaced which are adapted to gather the weeds deposited from the rear beaters. The inner end of the shaft 51 is provided with a crank 54 which is connected by a rod 55 to a bell crank 56 pivotally attached to the plough frame. The bell crank is supplied with a foot pedal 57 and the arrangement is such that when the foot pedal is tripped forwardly, the forward end of the bell crank moves down to bring the pivot point 58 of the bell crank to the frame above the pivot point 59 connecting the forward end of the rod to the bell crank. The forks are accordingly locked in their up position and it is only necessary for the driver to kick the foot pedal rearwardly in order to unlock the prongs and cause the weeds to be dropped on the ground surface.

The machine is hitched to the plough frame in any suitable manner which will permit of it being adjusted and will also maintain the machine in a more or less fixed relation in respect to the plough. This is done in the present instance, by securing to the rear end of the plough frame a pair of similar vertically disposed links 60 which provide runways for rollers 61 carried by the forward ends of pairs of draw bars 62 and 63, the rear ends of which are permanently bolted to the engine platform.

When the machine has been hitched to the plough and is being drawn over the land by the plough and the engine is operating, the earth ploughed by the plough will be delivered over the plate 7 and fingers 8 to the beaters of the front cross shaft 32 and here it is again pointed out that the earth is delivered to these beaters with the top or soil side up. The strip or clods of earth so delivered are caught by the teeth of the front beaters and passed rearwardly to the next beaters which are moving faster than the front beaters and this transfer of the earth from one set of beaters to the other is continued from the front to the back of the machine. The earth is held down against the beaters by the pressure plate 44 and the weeds are prevented from winding around the shaft 32 by the rollers 42. The action of the sets of beaters revolving in the direction indicated and at different speeds is such that as the clods of earth move back, the soil is loosened from the weed roots and falls down onto the ground beneath the machine whilst the weed roots are transferred from beater teeth to beater teeth and are finally discharged onto the forks 53. The attendant can dump the collected weed roots from the forks when he desires and would naturally dump them so as they would lie in windrows on the field so that they could be conveniently subsequently collected and burned. The pressure plate is inclined as shown so that it will exert a down pressure on the passing material and hold it to the beaters, although it will be observed that the springs allow the plate to accommodate itself to the passing clods.

Whilst I have entered into a detailed description of the various parts of the machine, it will be readily understood that the structural details thereof could be readily modified without departing from the spirit of the invention which requires that the ploughed earth be transmitted to the beaters surface or sod side up and that it be worked by the beaters to separate the dirt from the weed roots and permit the dirt to fall down and the weed roots to be passed rearwardly where they can be subsequently directly deposited on the ground surface or on gathering forks as herein shown.

The fingers 8 function not only to transmit ploughed earth to my machine but they also allow stones and other solid material to escape before the earth reaches the machine so that there is no possibility of the machine being damaged by them.

What I claim as my invention is:—

1. A portable weed eradicating machine comprising a platform, an engine mounted thereon, opposing suitably supported spaced side walls positioned to one side of the platform, a set of spaced cross shafts rotatably carried by the side walls and extending there between, a further set of similar cross shafts alternated between the former shafts and rotatably mounted in the side walls, a driving connection between the engine shaft and one of the cross shafts, a driving connection between the latter cross shaft and the remaining cross shafts of the set containing it whereby the cross shafts of that set are rotated in the same direction and at the same speed, a driving connection between the said cross shaft and the cross shafts of the other set whereby the latter set of cross shafts are rotated in the same direction and at a different speed to the former set of cross shafts, outstanding teeth carried by all of the cross shafts, the teeth of adjacent shafts being in staggered relation and lapping, means for passing ploughed earth to the foremost teeth of the machine and with the top side of the ploughed earth uppermost and means disposed between the side walls and above the teeth yieldingly pressing the passing earth towards the teeth.

2. A portable weed eradicating machine comprising a platform, an engine mounted on the platform, opposing spaced side walls situated at one side of the platform, a set of spaced cross shafts extending between the side walls and rotatably carried thereby, a further set of cross shafts similarly mounted and alternated with the first set, a driving connection between the rearmost cross shaft and the engine, a driving connection between the rearmost cross shaft and the remaining shafts of the set containing it, a driving connection between the rearmost cross shaft and the shafts of the other set, said driving connections being arranged such that all the shafts are rotating in the same direction and the sets of shafts at different speeds, outstanding teeth secured to the shafts, the teeth of adjacent shafts being alternated and lapped, a pressure plate yieldingly supported above the teeth and means for passing ploughed earth to the foremost teeth of the machine and with the top side of the ploughed earth uppermost.

3. A portable weed eradicating machine comprising a platform, an engine mounted on the platform, opposing spaced side walls situated at one side of the platform, a set of spaced cross shafts extending between the side walls and rotatably carried thereby, a further set of cross shafts similarly mounted and alternated with the first set, a driving connection between the rearmost cross shaft and the engine, a driving connection between the rearmost cross shaft and the remaining shafts of the set containing it, a driving connection between the rearmost cross shaft and the shafts of the other set, said driving connections being arranged such that all the shafts are rotating in the same direction and the sets of shafts at different speeds, outstanding teeth secured to the shafts, the teeth of adjacent shafts being alternated and lapped, rollers mounted on the cross shafts and interposed between the teeth thereof, a pressure plate yieldingly supported above the teeth and means for passing ploughed earth to the foremost teeth of the machine and with the top side of the ploughed earth uppermost, and dumpable collecting prongs located at the rear end of the machine and adapted to receive the weed roots discharged from the rearmost teeth.

Signed at Winnipeg this 29th day of December 1924.

FRANKLIN KING CARRICK.